July 31, 1934.  B. A. JOHNSON  1,968,646
INTERNAL COMBUSTION ENGINE
Filed Feb. 19, 1931  3 Sheets-Sheet 1
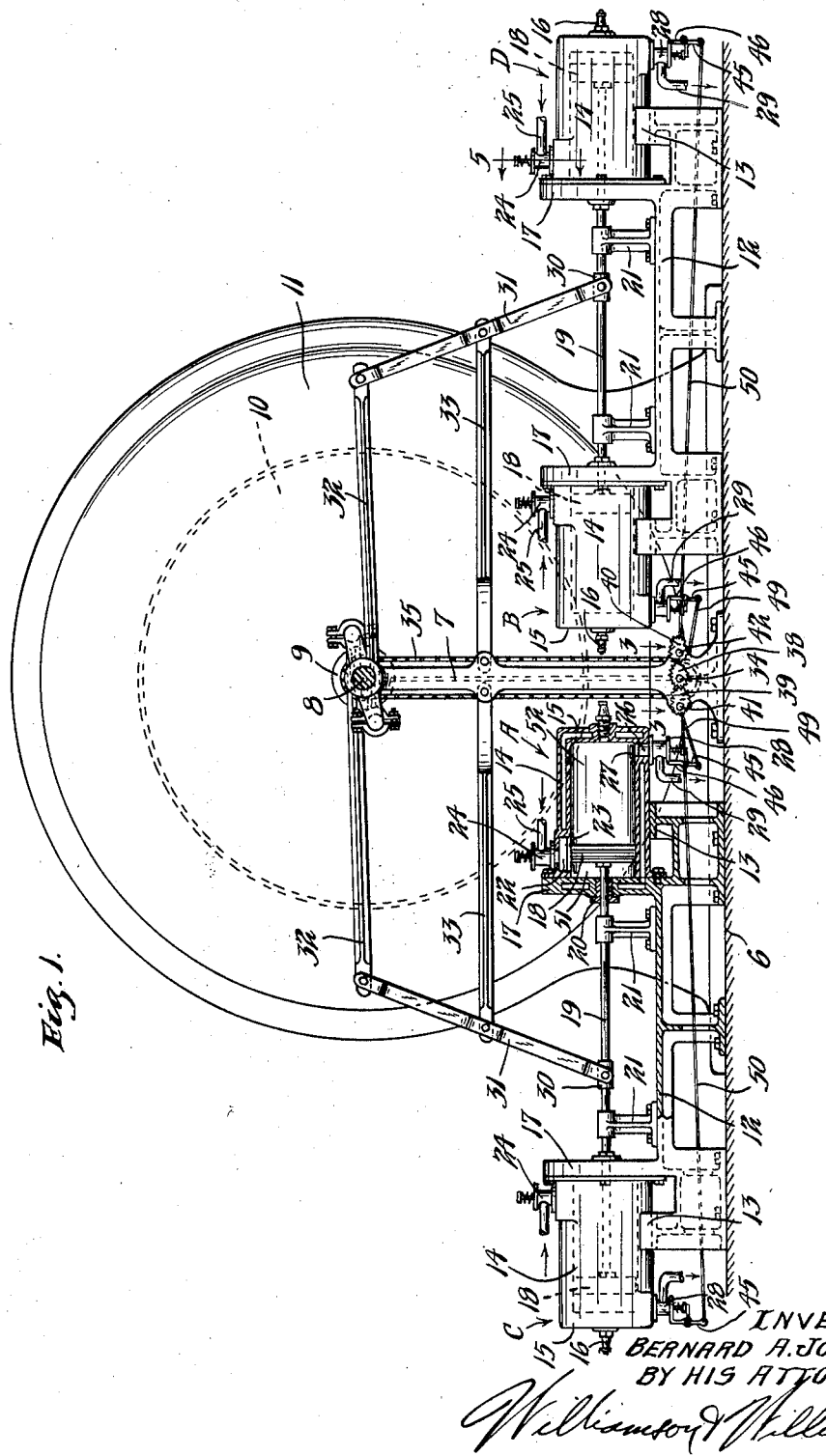
INVENTOR
BERNARD A. JOHNSON.
BY HIS ATTORNEYS

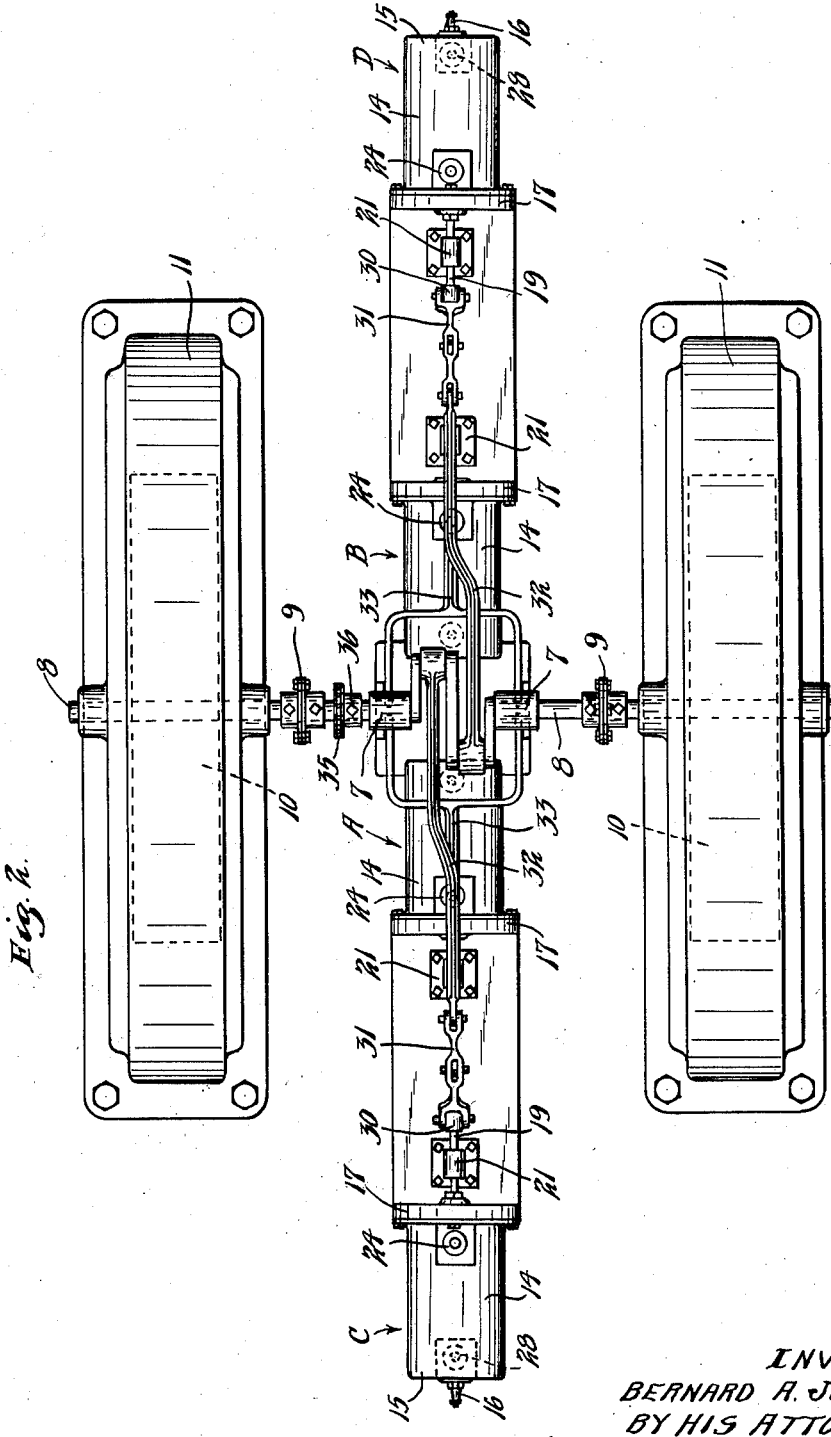

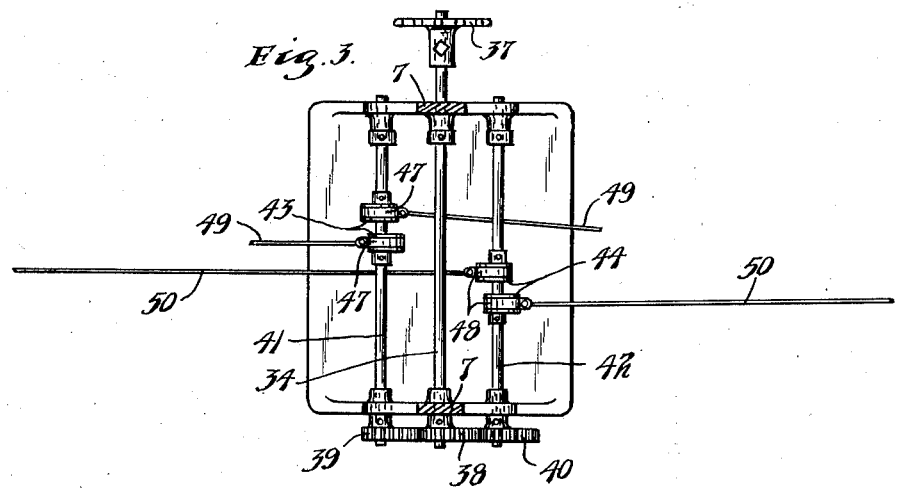
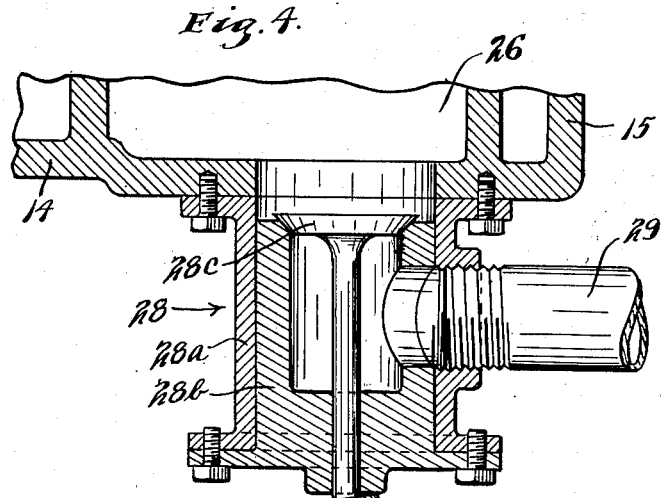
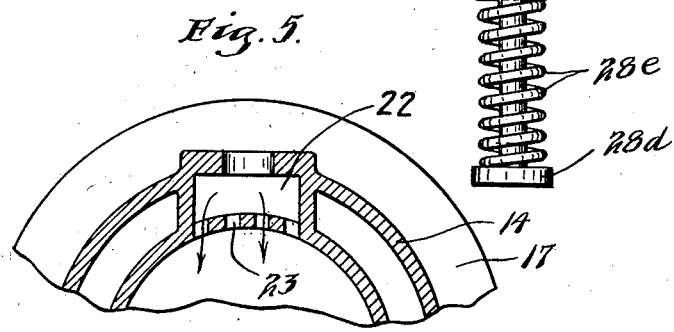
INVENTOR.
BERNARD A. JOHNSON
BY HIS ATTORNEYS

Patented July 31, 1934

1,968,646

UNITED STATES PATENT OFFICE 1,968,646

INTERNAL COMBUSTION ENGINE

Bernard A. Johnson, Minneapolis, Minn., assignor of forty-nine per cent to David J. Murphy, Minneapolis, Minn.

Application February 19, 1931, Serial No. 516,930

5 Claims. (Cl. 123—56)

This invention relates to internal combustion engines, and particularly to internal combustion engines that are adapted to be used for generating power to drive electric locomotives.

It is one of the objects of this invention to provide an internal combustion engine having one or more groups of four cylinders for driving a power shaft, which cylinders are so mounted and so connected to the power shaft that the engine will be subject to practically no vibration.

Another object is to provide an internal combustion engine including a power shaft, a pair of opposed cylinders having their pistons interconnected by a common piston rod, means for transmitting power from said piston rod to said shaft, a second pair of opposed cylinders having their pistons interconnected by a common piston rod and means for transmitting power from said second mentioned piston rod to said power shaft, the said two means being adapted to act to exert force to rotate said power shaft at the same time and in opposite directions so as to balance the power applied to the power shaft.

Another object of the invention is to provide a novel and improved two cycle engine.

Still another object is to provide novel means for actuating the exhaust valves of a two cycle engine.

A further object is to provide a compact engine capable of generating a great amount of power within a comparatively small floor space.

One other object is to provide an internal combustion engine having a low center of gravity but permitting any type of electrical generator to be mounted on the same base as the engine and to be driven directly from the crank shaft of the engine.

To these ends, the invention consists in the novel parts and novel combinations of parts hereinafter defined in the claims and described in the following specification, made in connection with the accompanying drawings, wherein like reference characters refer to the same or similar parts throughout the various views, and, in which, Fig. 1 is a view in side elevation of an internal combustion engine embodying the present invention, one of the cylinders and certain of the parts being shown in vertical section to more clearly illustrate the construction thereof;

Fig. 2 is a plan view of the engine illustrated in Fig. 1;

Fig. 3 is a horizontal section taken on the line 3—3 of Fig. 1, as indicated by the arrows;

Fig. 4 is a vertical section taken through the exhaust valve of one of the cylinders; and Fig. 5 is a vertical section taken on the line 5 of Fig. 1, as indicated by the arrows, through one of the cylinders with the intake valve removed.

Referring to the drawings, the engine of the present invention is illustrated as being installed on a suitable base 6, which may be the floor of an electric locomotive or any other suitable support. Mounted on this base 6 is a vertical standard 7 including a pair of spaced arms having bearings formed at their upper ends within which a crank shaft 8 is journaled. The crank shaft 8 has two crank portions longitudinally spaced from each other and diametrically opposed from each other, the said crank portions being preferably located between the two arms of the standard 7. Secured to the two ends of the crank shaft 8 by means of couplings 9 are the rotors 10 of a pair of electric generators, the stators 11 of which encompass the rotors 10 and are mounted on the base 6. The two rotors 10 of the generators are adapted to serve in place of and to have the function of a fly wheel of an ordinary internal combustion engine.

Mounted in alinement on the base 6 at right angles to the axis of the crank shaft 8 and disposed one at either side of the standard 7, are a pair of cylinder bases 12. Each cylinder base 12 is preferably provided with a saddle 13 at each end upon which a water jacketed cylinder 14 is mounted. Although these cylinders are constructed exactly alike, two cylinders are mounted in opposed relation on one of the cylinder bases 12 and the other two cylinders are mounted in opposed relation on the other cylinder base 12. The two inner cylinders may be designated A and B respectively, and the two outer cylinders may be designated C and D respectively. The cylinder A faces the cylinder C and the cylinder B faces the cylinder D, the cylinders A and C forming one pair of cylinders and the cylinders D and B forming a second pair of cylinders. Each cylinder 14 has a head 15 within which a suitable ignition means, such as a spark plug 16 is disposed and each cylinder also has an end closure 17 which as illustrated in the drawings may be secured to or formed integral with the particular cylinder base 12 on which the cylinder 14 is mounted. The heads 15 of the two cylinders A and B are inwardly disposed from the end closures 17 of the respective cylinders relative to the standard 7, while the heads 15 of the cylinders C and D are outwardly disposed from the end closures 17 of the respective cylinders, relative to the standard 7. Each cylinder 14 is equipped with a ring equipped piston 18 and the pistons of the two cylinders A and C and the pistons of the two cylinders D and B are interconnected by piston rods 19, which project through packing glands 20 mounted in the end closures 17 of the cylinders. The piston rods 19 are journaled in upstanding bearings 21 secured to the cylinder bases 12 in spaced relation from the end closures 17. Each cylinder 14 adjacent the end closure 17 therefor is provided at its upper portion with a fuel by-pass chamber 22, which is of somewhat greater length taken longitudinally of the cylinder than the piston 18 disposed therein and the cylinder wall below the by-pass chamber 22 has longitudinal slots 23 cut therein forming a grating, as best illustrated in Fig. 5, affording communication between the chamber 22 and the interior of the cylinder. A spring loaded fuel intake valve 24 of any conventional type is secured to the chamber 22 and as this valve may be of identically the same construction as the exhaust valve hereinafter described and illustrated in detail in Fig. 4, it is thought unnecessary to further describe the valve 24. Any desired type of combustible fuel may be supplied preferably under pressure to each valve 24 through a suitable conduit 25, which conduit may have communication with a carburetor or other mixing valve (not illustrated). The spring loaded intake valve 24, of course, has communication with the chamber 22 through a port provided in the chamber. Sufficient clearance between the outer wall of the chamber 22 and the grating formed by the slots 23 in the cylinder wall is provided for proper movement of the intake valve. Adjacent the head 15, each cylinder is provided at its lower side with a small exhaust chamber 26 and the cylinder wall is equipped with slots 27, shown in Fig. 1, forming a grating over this chamber 26. Secured to this exhaust chamber is a spring loaded exhaust valve 28c which communicates with the chamber 26 and leads to an exhaust pipe 29. The valve 28c, although it may be of any well known construction, is shown in the drawings as including a flanged open ended casing 28a bolted to the cylinder 14 below the exhaust chamber 26 and having communication with the exhaust chamber through a port provided in the outer wall of the said chamber. The casing 28a has an apertured and screw threaded boss at one side of the same to which the exhaust pipe 29 is secured. Fitting within the casing 28a is a valve seat member 28b, which is bolted to the outer flange of the casing to close the outer end of the same and this valve seat member is equipped with a side port communicating with exhaust pipe 29 and leading from a vertical bore extending outwardly from the inner end of the valve seat member for some little distance. The valve seat proper is formed at the inner end of the valve seat member 28b and a valve 28c operates in conjunction with the seat and has a stem projecting through the outer end of the valve seat member 28b. The stem of the valve 28c is equipped with a head 28d at its outer end and a coiled pressure spring 28e surrounds the outer portion of the valve stem and reacts between the head 28d and a lug formed at the outer end of the valve seat member 28d. Sufficient clearance is provided between the seat of the valve seat member 28b and the grating formed in the cylinder wall by the slots 27 to permit proper movement of the head of the valve 28c to and from the seat.

Secured to the central portion of each piston rod 19 is a short sleeve 30 carrying a pair of oppositely disposed pins on which the lower forked ends of a connecting bar 31 are mounted. Each connecting bar 31 may be provided at its upper end with furcations pivotally connected to pins carried at the outer end of a connecting rod 32 having a cap bearing at its inner end embracing one of the crank portions of the crank shaft 8. The two connecting rods 32 may be offset somewhat adjacent their inner ends relative to a line taken directly at right angles from the axis of the crank shaft 8 to the two upper ends of the connecting bars 31, so that one of the connecting rods 32 may be properly alined with one crank portion of the crank shaft 8 while the other connecting rod 32 may be properly alined with the other crank portion of the crank shaft 8. Fulcrum bars 33 are provided and each of these bars may, as shown, have a forked inner end, the furcations of which are pivotally connected to the respective arms of the standard 7 above the level of the cylinders 14. The outer ends of the fulcrum bars 33 are pivotally connected to central portions of the connecting bars 31 respectively, and for this purpose the connecting bars 31 may each be equipped at their central portions with slots receiving the outer ends of the respective fulcrum bars 33 and pins mounted in the slotted portions of the connecting bars 31 may be extended through the respective ends of the fulcrum bars 33 and across the said slots. It will be seen that the connecting bar 31, connecting rod 32 and fulcrum bar 33 at each side of the standard 7, form a walking beam construction for transmitting power from the piston rod 19 at the same side of the standard 7 to the crank shaft 8. It will also be noted that the two walking beam constructions will transmit power to the crank shaft 8 at diametrically opposed points on the crank shaft.

It will not be necessary to provide positive means such as a cam shaft driven from the crank shaft 8 to operate the intake valves 24, although such means may, of course, be provided if so desired. Special means will preferably, although not necessarily, be provided for very rapidly opening and closing the exhaust valves 28 at the proper times. For this purpose, a shaft 34 is journaled in the standard 7 adjacent the base of the same and this shaft is driven at the same speed as the crank shaft 8 as by means of an endless chain 35 running over a sprocket 36, carried by the crank shaft 8, and a sprocket 37, carried by the shaft 34 as at one end of the same. The shaft 34 at one end has an elliptic gear 38 mounted in eccentric relation thereon and this elliptic gear 38 meshes with two elliptic gears 39 and 40 mounted in eccentric relation respectively, on a pair of counter shafts 41 and 42 also journaled in the standard 7 and extending parallel to the shaft 34. A pair of eccentrics 43 are mounted on the shaft 41 with their similar surfaces diametrically opposed to each other while a second pair of eccentrics 44 are mounted on the counter shaft 42 with their similar surfaces diametrically opposed to each other. Bell crank levers 45 are pivotally mounted in brackets 46 secured to the exhaust valves 28 and depending downwardly therefrom and each bell crank lever 45 has one downwardly projecting arm and another arm bearing against the head 28d on the stem of a valve 28c. Straps 47 are applied to the two eccentrics 43, while similar straps 48 are applied to the two eccentrics 44 and short rods 49 are secured to the two straps 47 respectively and are respectively pivotally connected to the downwardly projecting arms of the bell crank levers 45 actuating the exhaust valves 28 of the two inner cylinders A and B, while long rods 50 are connected respectively to the two straps 48 and are pivotally connected at their outer ends to the downwardly projecting arms of the bell crank levers 45 actuating the exhaust valves 28 of the respective outer cylinders C and D. The two elliptic gears 39 and 40 are mounted on the two shafts 41 and 42 in exactly the same relation and as a result when the shaft 34 is driven, the shaft 41 will be speeded up during its rotation at the same time that the shaft 42 is slowed down during its rotation, and vice versa. At certain times during their rotation, the two shafts 41 and 42 will be rotated much more rapidly than the shaft 34, while at other times the two shafts 41 and 42 will be rotated much more slowly than the shaft 34. A very quick opening and closing movement can be imparted to the exhaust valves 28 by the mechanism described. The exhaust valve can be very rapidly opened and allowed to remain open for a certain definite period of time and then very quickly closed to remain completely closed until again suddenly opened. Due to the positioning of the two eccentrics 43 on the shaft 41, the two exhaust valves 28 for the inner cylinders A and B will be simultaneously and similarly actuated, while due to the positioning of the two eccentrics 44 on the shaft 42, the two exhaust valves 28 of the outer cylinders C and D will be simultaneously and similarly actuated. The relationship of the eccentrics 44 on the shaft 42 relative to the relationship of the eccentrics 43 on the shaft 41 is such that as the crank shaft 8 is rotated through the first 180° of a complete revolution, the exhaust valves 28 of the outer cylinders C and D will be actuated by the rods 50 in exactly the same manner as the exhaust valves 28 of the inner cylinders A and B are actuated during the remaining 180° of the complete revolution of the crank shaft 8, and vice versa. After the exhaust valves of the inner cylinders A and B have been opened and closed, the crank shaft 8 will rotate through half a revolution before the exhaust valves 28 of the outer cylinders C and D are similarly opened and closed.

Operation

Before considering the operation of the complete engine, let us consider the operation of a single cylinder, such as the cylinder A which in itself forms a complete two cycle internal combustion engine. For convenience in explanation, the piston 18 may be considered to divide the cylinder 14 into two chambers, a compression chamber 51 located between the end closure 17 and the left side of the piston 18, as viewed in Fig. 1, and a firing chamber 52 located between the head 15 and the right side of the piston 18. Considering that the piston of cylinder A is in the position illustrated in Fig. 1, as the piston moves to the right toward the head 15, the suction created by the piston in the compression chamber 51 will draw a charge of fuel into the compression chamber 51. The intake valve 24 will be caused to open against the tension of the spring loading the valve and the charge will be drawn from the conduit 25 into the fuel by-pass chamber 22 and thence through the grating formed by the slots 23 into the compression chamber 51. As the piston 18 moves toward the end closure 17, the charge will be compressed in the compression chamber 51 until the piston arrives at approximately the position shown in Fig. 1, whereupon the compressed charge will by-pass around the piston 18 and into the firing chamber 52. The compressed charge will run from the compression chamber 51 through the slots 23 into the by-pass chamber 22 and then again through the slots 23 into the firing chamber 52. As the travel of the compressed charge to by-pass the same around the piston 18 is but very short, the charge will be quickly carried into the firing chamber 52. As the piston 18 moves toward the head 15, the charge in the firing chamber 52 will be somewhat further compressed, whereupon as the piston reaches the end of its stroke toward the head 15, the ignition means 16 will be actuated to explode the charge and thereby force the piston 18 toward the end closure 17. During this power stroke and as the right hand end of the piston 18, as viewed in Fig. 1, passes the right ends of the slots 23, the exhaust valve 28 is opened by the exhaust valve actuating mechanism, whereupon the exploded gases from the firing chamber 52 will be exhausted through the slots 27, exhaust chamber 26 and exhaust valve 28 into the exhaust pipe 29. The fresh compressed charge by-passing around the piston 18 from the compression chamber 51 into the firing chamber 52 will assist in scavenging the exploded gases from the firing chamber 52. The exhaust valve will remain open until on the return stroke of the piston 18 toward the head 15, the piston passes the right ends of the slots 23 whereupon the exhaust valve actuating mechanism will permit the spring 28e to quickly close the exhaust valve. Of course, a fresh charge is drawn into the compression chamber 51 on each stroke of the piston 18 toward the head 15, and the exploded gases from the preceding charge are chiefly exhausted from the firing chamber 52 on this same stroke of the piston. On the stroke of the piston toward the end closure 17, a charge is exploded in the firing chamber 52 and a fresh charge is being compressed in compression chamber 51, the compressed charge being by-passed from the compression chamber 51 to the firing chamber 52 toward the end of this stroke. By placing the by-pass chamber 22 at the top of the cylinder and adjacent the closure plate 17 and by locating the exhaust chamber 26 at the lower side of the cylinder adjacent the head 15, the direction of travel of the exploded exhaust gases from the firing chamber 52 to exhaust pipe 29, is in general alinement with the direction of travel of the fresh charge as it is admitted from the by-pass chamber 22 to the firing chamber 52. As a result, the admission of the fresh charge into the firing chamber 52, materially assists in the scavenging of the products of combustion. The rapidly acting exhaust valve actuating mechanism properly times the movement of the exhaust valve, so that practically all of the products of combustion are scavenged from the firing cylinder 52 and yet none of the fresh charge admitted to the chamber 52 is carried out of the chamber into the exhaust pipe. As the charge is exploded in the firing chamber 52, the entire force from the explosion is directed against the piston 18 in the direction of movement of the piston. As a result, the utmost efficiency is developed and there is no torsional strain imposed either on the piston 18, the piston rod 19 or the bearing 21. Due to the provision of the bearing 21, located in spaced relation from the closure plate 17, but adjacent thereto, the packing gland 20 receives but slight wear.

The relation between the cylinder A and the cylinder C of one pair of cylinders and the cylinder D and the cylinder B of the other pair of cylinders is such that the cylinders A and B fire during the strokes of the piston rods 19 outwardly from the standard 7 and the cylinders C and D fire during the strokes of the piston rods 19 inwardly toward the standard 7. As a result, each piston rod 19 has a power stroke in each direction. The power stroke of the pistons of cylinders C and D are transmitted simultaneously through the walking beam constructions to diametrically opposite points on the crank shaft 8 simultaneously, while the power strokes from the pistons 18 of the inner cylinders A and B are similarly transmitted simultaneously to diametrically opposite points on the crank shaft 8. As a result, the forces applied to the crank shaft are always balanced and vibration of the various parts is practically eliminated. Due to the disposition of the various cylinders A, B, C, and D relative to the crank shaft 8, as many groups of four cylinders as desired may be used to transmit power to the single crank shaft 8. The rotors 10 the generators serve in exactly the same capacity as does a fly wheel on an ordinary internal combustion engine and the energy otherwise expended in driving a fly wheel is utilized. By provision of the two generators at either end of the crank shaft 8, a balance is effected on the crank shaft that would not be obtained if a single generator were used. The particular type of driving connections between the two piston rods 19 and the main shaft 8 of the engine can be considerably varied if desired. Also the shaft 8 can be variably positioned relative to the different cylinders.

It will, of course, be understood that many other changes may be made in the form, details, arrangement and proportions of the various parts without departure from the scope of the present invention.

The engine of the present invention is particularly adapted for use to generate power for driving an electric locomotive. The even application of power simultaneously from the two pairs of cylinders to diametrically opposed points on the crank shaft, permits of practically no vibration of the parts of the engine and as a result, it is possible to mount the engine on a locomotive or, for that matter, in any other desired place without the necessity or provision of a heavy base. The space taken up by the engine is small in comparison to the enormous power developed and for this reason also the engine is particularly adapted for use on a locomotive. Due to the fact that the crank shaft may be placed well above the cylinders it is possible to use any desired type of generator directly driven from the crank shaft of the engine and yet the center of mass of the engine will be extremely low relative to the base on which the engine is supported. Also it is possible to mount the generator directly driven from the crank shaft of the engine on the same base as the base on which the cylinders of the engine are mounted. By use of the walking beam construction for driving the crank shaft from the piston rods, practically any type of generator can be used with the engine.

What is claimed is:—

1. A multi-cylinder internal combustion motor having in combination, two pairs of opposed two cycle internal combustion engines, each including a reciprocating piston, a piston rod connecting the two pistons of each pair, a suitably journaled crank shaft having two spaced crank portions diametrically opposed to each other, means for transmitting the motion from one of said piston rods to one of said crank portions, means for transmitting the motion from the other of said piston rods to the other crank portion, one engine of one pair being timed to fire simultaneously with one engine of the other pair and the remaining engines of said pairs being timed to fire simultaneously, whereby the stresses and strains imposed on said crank shaft by said transmitting means will be evenly and oppositely balanced.

2. A multi-cylinder internal combustion motor having in combination two pairs of opposed two cycle internal combustion engines, all of which are mounted in line and each of which includes a reciprocating piston, a piston rod connecting the two pistons of each pair of engines, a suitably journaled crank shaft centrally located relative to the two pair of engines and having two spaced and diametrically opposed crank portions thereon, said crank shaft being set normal to the direction of movement of said pistons, a piston rod connecting the two pistons of each pair of engines, the two engines farthest outwardly disposed from said crank shaft being adapted to fire simultaneously once during each complete rotation of said crank shaft to drive said piston rods inwardly and the two engines most adjacent said crank shaft being adapted to fire simultaneously once during each complete rotation of said crank shaft to drive said piston rods outwardly from said crank shaft, means for transmitting the motion from one of said piston rods to one crank portion of said crank shaft and means for transmitting the motion from the other of said piston rods to the other crank portion of said crank shaft, whereby the stresses and strains imposed on said crank shaft by said transmitting means will be evenly and oppositely balanced.

3. A multi-cylinder internal combustion motor having in combination, a suitably journaled crank shaft, two pair of opposed internal combustion engines, each engine including a reciprocating piston, piston rods interconnecting the two pistons of each pair, one engine of one pair being adapted to fire simultaneously with one engine of the other pair to drive said piston rods toward each other, and the remaining engines of the two pair being adapted to fire simultaneously to drive said piston rods away from each other, and walking beam constructions for transmitting the power from each piston rod to said crank shaft.

4. The structure defined in claim 3, said walking beam constructions comprising a standard, fulcrum bars pivoted thereto and projecting outwardly therefrom, connecting bars pivoted to said piston rods and pivotally mounted on said fulcrum bars and connecting rods connected to the crank portions of said crank shaft and pivotally connected to said connecting bars.

5. A multi-cylinder internal combustion motor having in combination, a suitably journaled crank shaft having a pair of longitudinally spaced and diametrically opposed crank portions, two pair of opposed internal combustion engines, all of said engines being mounted in line at right angles to said crank shaft and each pair including an outer engine and an inner engine, the outer engine being more remotely disposed from said crank shaft than said inner engine, each engine including a reciprocating piston, piston rods interconnecting two pistons of each pair, the outer engines being adapted to fire simultaneously to drive said piston rods inwardly toward said crank shaft, and the inner engines being adapted to fire simultaneously to drive said piston rods outwardly from said crank shaft, a standard centrally located relative to said two pair of engines, fulcrum bars pivoted to said standard, connecting bars pivoted to said piston rods and also pivotally connected to said fulcrum bars and connecting rods pivotally connected to said connecting bars and connected to the respective crank portions of said crank shaft.

BERNARD A. JOHNSON.